(12) United States Patent
Newton

(10) Patent No.: US 12,155,584 B2
(45) Date of Patent: **\*Nov. 26, 2024**

(54) STORE AND FORWARD LOGGING IN A CONTENT DELIVERY NETWORK

(71) Applicant: Sandpiper CDN, LLC, Wilmington, DE (US)

(72) Inventor: Christopher Newton, Westlake Village, CA (US)

(73) Assignee: Sandpiper CDN, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/241,483

(22) Filed: Sep. 1, 2023

(65) Prior Publication Data

US 2023/0412529 A1 Dec. 21, 2023

Related U.S. Application Data

(63) Continuation of application No. 17/480,196, filed on Sep. 21, 2021, now Pat. No. 11,750,536, which is a continuation of application No. 16/849,444, filed on Apr. 15, 2020, now Pat. No. 11,134,033, which is a continuation of application No. 15/949,297, filed on Apr. 10, 2018, now Pat. No. 10,630,611.

(51) Int. Cl.
| | |
|---|---|
| *H04L 49/90* | (2022.01) |
| *H04L 43/0811* | (2022.01) |
| *H04L 43/0888* | (2022.01) |
| *H04L 67/1097* | (2022.01) |

(52) U.S. Cl.
CPC ...... *H04L 49/9084* (2013.01); *H04L 43/0811* (2013.01); *H04L 43/0888* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 2007/0211674 | A1 | 9/2007 | Ragnar Karlberg |
| 2010/0332454 | A1 | 12/2010 | Prahlad et al. |
| 2012/0131184 | A1 | 5/2012 | Luna et al. |
| 2013/0103779 | A1 | 4/2013 | Bai |

(Continued)

FOREIGN PATENT DOCUMENTS

| | | |
|---|---|---|
| JP | 2005316987 | 11/2005 |

OTHER PUBLICATIONS

Extended European Search Report, dated Dec. 2, 2021, Application No. 18914517.0, filed Jun. 14, 2018; 10 pgs.

(Continued)

*Primary Examiner* — Robert M Morlan
(74) *Attorney, Agent, or Firm* — C. Tumey Law Group PLLC

(57) ABSTRACT

A computer-implemented method on a device. The device has hardware including storage. The method includes obtaining log event data from at least one component or service on the device that is to be delivered to a component or service on a distinct device. Each log event data item has a priority. If a connection to an external location is lost, at least some of the log event data items are selectively stored in the storage, wherein the storing is based on priority of the log event data items. Otherwise, if the connection is not lost, at least some of the log event data items are sent to the at least one external location.

28 Claims, 7 Drawing Sheets

(56) References Cited

U.S. PATENT DOCUMENTS

| | | |
|---|---|---|
| 2013/0227352 A1 | 8/2013 | Kumarasamy |
| 2014/0119554 A1 | 5/2014 | Chan |
| 2014/0223015 A1 | 8/2014 | Varney et al. |
| 2016/0294849 A1 | 10/2016 | Adams |
| 2017/0230324 A1 | 8/2017 | Seigel |
| 2020/0244602 A1 | 7/2020 | Newton |
| 2022/0006759 A1 | 1/2022 | Newton |

OTHER PUBLICATIONS

International Preliminary Report on Patentability, dated Oct. 22, 2020, Int'l Appl. No. PCT/US18/037526, Int'l Filing Date Jun. 14, 2018; 8 pgs.

International Search Report and Written Opinion of the International Searching Authority, dated Sep. 10, 2018, Intl Appl. No. PCT/US18/037526, Intl Filing Date Jun. 14, 2018; 9 pgs.

| LOG RETENTION RULES | | | |
|---|---|---|---|
| TYPE | PERCENTAGE RESERVED MEMORY | PERCENTAGE RESERVED DISK | PRIORITY |
| BILLING | 50% | 90% | I |
| CONNECTION | 25% | 8% | II |
| PERFORMANCE | 10% | 1% | III |
| ⋮ | ⋮ | ⋮ | ⋮ |
| $T_K$ | $P_K$% | $P_K$% | PRIORITY K |

| PRE-ALLOCATED MEMORY USAGE | | |
|---|---|---|
| PRIORITY | AMOUNT RESERVED | AMOUNT USED |
| I | 50% | 80% |
| II | 25% | 7% |
| III | 10% | 11% |

| PRE-ALLOCATED DISK USAGE | | |
|---|---|---|
| PRIORITY | AMOUNT RESERVED | AMOUNT USED |
| I | 90% | 5% |
| II | 8% | 90% |
| III | 1% | 75% |

STORE AND FORWARD LOGGING IN A CONTENT DELIVERY NETWORK

BACKGROUND OF THE INVENTION

Copyright Statement

This patent document contains material subject to copyright protection. The copyright owner has no objection to the reproduction of this patent document or any related materials in the files of the United States Patent and Trademark Office, but otherwise reserves all copyrights whatsoever.

Field of the Invention

This invention relates to content delivery and content delivery networks. More specifically, to content delivery networks and systems, frameworks, devices and methods supporting content delivery and content delivery networks.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

FIGS. 2 and 3A-3C depict aspects of exemplary embodiments hereof; and

DETAILED DESCRIPTION OF THE PRESENTLY PREFERRED EXEMPLARY EMBODIMENTS

Glossary

As used herein, unless used otherwise, the following terms or abbreviations have the following meanings:

CD means content delivery;

CDN means content delivery network;

DNS means domain name system.

A "mechanism" refers to any device(s), process(es), routine(s), service(s), module(s), or combination thereof. A mechanism may be implemented in hardware, software, firmware, using a special-purpose device, or any combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered shorthand for the term device(s) and/or process(es) and/or service(s).

DESCRIPTION

A content delivery network (CDN or CD network) distributes content (e.g., resources) efficiently to clients on behalf of one or more content providers, preferably via a public Internet. Content providers provide their content (e.g., resources) via origin sources (origin servers or origins). A CDN can also provide an over-the-top transport mechanism for efficiently sending content in the reverse direction—from a client to an origin server. Both end-users (clients) and content providers benefit from using a CDN. Using a CDN, a content provider is able to take pressure off (and thereby reduce the load on) its own servers (e.g., its origin servers). Clients benefit by being able to obtain content with fewer delays.

Figure 1:
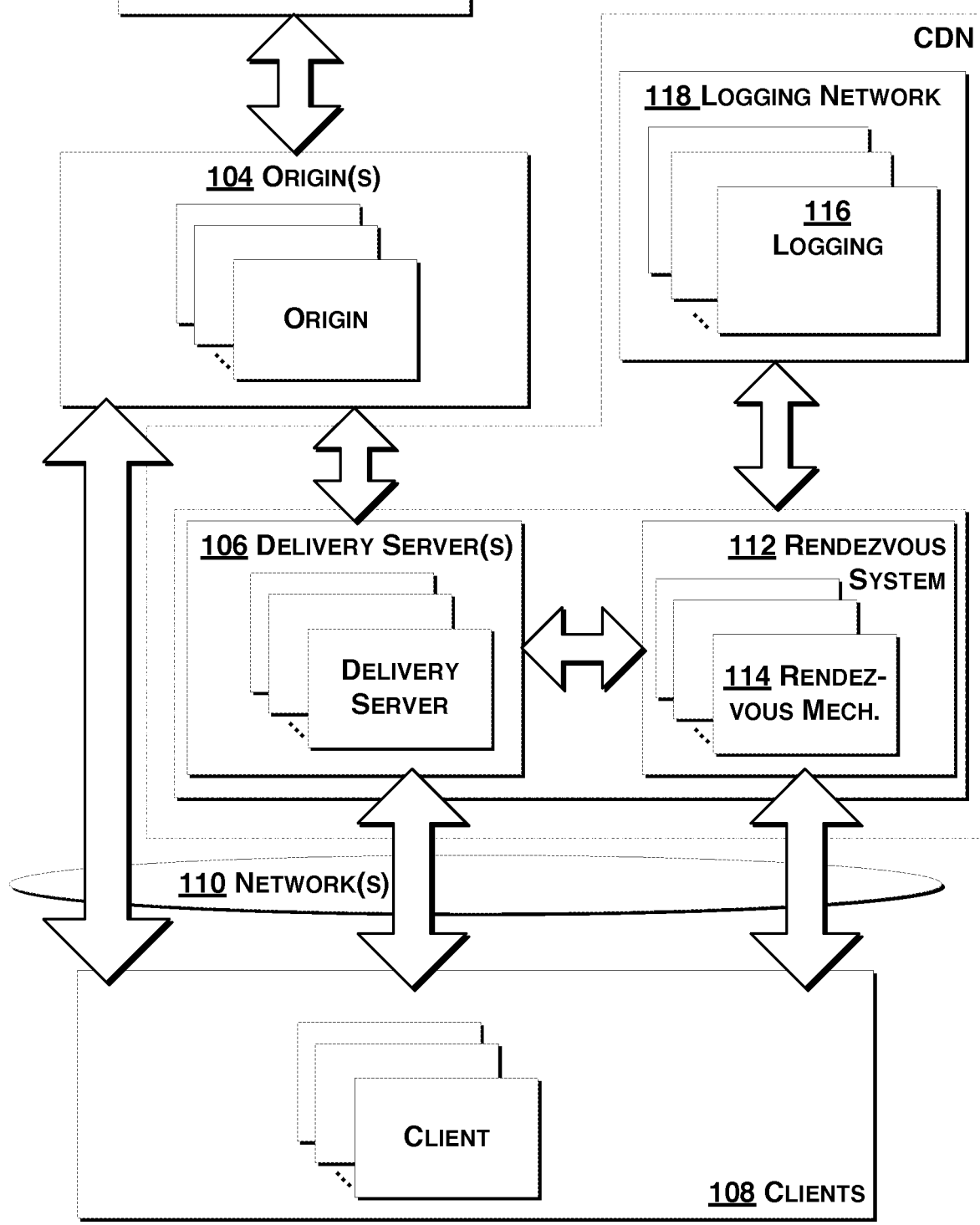
FIG. 1 depicts aspects of a content delivery network (CDN) according to exemplary embodiments hereof.

FIG. 1 shows aspects of an exemplary CDN in which one or more content providers 102 provide content via one or more origin sources 104 and delivery services (servers) 106 to clients 108 via one or more networks 110. The delivery services (servers) 106 may form a delivery network from which clients 108 may obtain content. The delivery services 106 may be logically and/or physically organized hierarchically and may include edge caches. The delivery services 106 may be logically and/or physically organized into clusters.

As should be appreciated, components of a CDN (e.g., delivery servers or the like) may use the CDN to deliver content to other CDN components. Thus a CDN component may itself be a client of the CDN. For example, the CDN may use its own infrastructure to deliver CDN content (e.g., CDN control and configuration information) to CDN components.

Client requests (e.g., for content) may be associated with delivery server(s) 106 by a rendezvous system 112 comprising rendezvous mechanism(s) 114, possibly in the form of one or more rendezvous networks. The rendezvous mechanism(s) 114 may be implemented, at least in part, using or as part of a DNS system, and the association of a particular client request (e.g., for content) with one or more delivery servers may be done as part of DNS processing associated with that particular client request (e.g., of a domain name associated with the particular client request).

Typically, multiple delivery servers 106 in the CDN can process or handle any particular client request for content (e.g., for one or more resources). Preferably the rendezvous system 112 associates a particular client request with one or more "best" or "optimal" (or "least worst") delivery servers 106 to deal with that particular request. The "best" or "optimal" delivery server(s) 106 may be one(s) that is (are) close to the client (by some measure of network cost) and that is (are) not overloaded. Preferably the chosen delivery server(s) 106 (i.e., the delivery server(s) chosen by the rendezvous system 112 for a client request) can deliver the requested content to the client or can direct the client, somehow and in some manner, to somewhere where the client can try to obtain the requested content. A chosen delivery server 106 need not have the requested content at the time the request is made, even if that chosen delivery server 106 eventually serves the requested content to the requesting client.

When a client 108 makes a request for content, the client may be referred to as the requesting client, and the delivery server 106 that the rendezvous system 112 associates with that client request (and that the client first contacts to make the request) may be referred to as the "contact" server or just the contact.

Exemplary CDNs are described in U.S. Pat. Nos. 8,060,613 and 8,925,930.

As noted above, the rendezvous mechanism(s) 114 may be implemented, at least in part, using or as part of a DNS system. Typically the rendezvous mechanism(s) 114 comprise a network of DNS name servers that are used to associate client requests with delivery servers.

CDN Component/Service Logging Architecture

Each CDN component (e.g., service) can preferably generate multiple loggable items. These loggable items may be based on measurements and information about the component itself (e.g., its load, capacity, etc.) and/or on measurements and/or information about operation of the component within or on behalf of the CDN (e.g., information about content stored, requested, served, deleted, etc.). Loggable items may be the individual values or sets of related values that are measured and emitted over time by the component. Each item may have a name and a definition that explains how to interpret instances of the value (as well as how it should be measured). While the set of loggable items that a component can emit at any time may be fixed by the design of the component, the actual loggable items generated by each component may be dynamically configured and may be modified during operation of the component.

A log event may be considered to be a time-stamped set of loggable item values that are produced by the component. That is, a log event may be considered to be a loggable item (comprising one or more values) associated with a time. It is essentially an assertion by the component that each of the contained log items had the given value at the given time (according to a local clock of the component). A log event may also include other independent variables defining the scope of the measurement. The grouping of loggable items into log event types is preferably fixed by the design of the component.

The possible loggable items and events that can be generated by a CDN component (e.g., a cache server or a rendezvous mechanism) are preferably statically designed into the component, and the log event producer(s) for each component are preferably configured/selected as part of that component's initialization (initial configuration). The log event producer(s) for a component need not be static for the life of the component (e.g., the component may be reconfigured during operation).

Those of ordinary skill in the art will realize and understand, upon reading this description, that these various loggable item generator mechanisms may be implemented in hardware, firmware, software, or any combination thereof.

The exemplary CDN may include one or more CD logging mechanisms 116 forming at least one logging network 118. A CD logging mechanism 116 may correspond to a reducer and/or collector, and the CD logging network 118 may correspond to a reducer and/or collector network (e.g., as described in U.S. Pat. Nos. 8,060,613 and 8,925,930).

Log Store and Forward

As described, a device or machine (e.g., a server or the like) in a CDN may generate various types of log data relating to services running on the device. As shown, e.g., in FIG. 2, a device 200 may be running various services (denoted Service #1 ... Service #J). The services may include CD services (e.g., rendezvous services, caching services, streaming services, object services, delivery services, compute services, controlling services, reducer services, collector services, monitoring services, storage services, object distribution services, and compute distribution services, logging services, etc.). Each service may produce log data (e.g., as described above), and the log data may be consumed (on the machine 200) by a log message handler 202.

The log message handler 202 takes log data from the various services and sends those data (directly or in some encoded form) to one or more locations off the machine 200 (e.g., to a CD logging mechanism 116 or logging network 118 in FIG. 1). Preferably the log message handler 202 sends log data to at least two off-machine locations (e.g., to at least two CD logging mechanisms).

The device 200 may include memory 204 (e.g., RAM or the like) as well as one or more disks 206. In order to reduce latency and load on the device 200, log data are preferably stored, if at all, in memory 204 (if needed), and are preferably not written to disk(s) 206. As should be appreciated, a device 200 may have multiple types of memory and storage mechanisms, each with different speeds and capacities. While this description refers to memory 204 and disks 206, those of ordinary skill in the art will appreciate and understand, upon reading this description, that other types of memory and storage mechanisms may be used. In preferred embodiments, however, the component(s) referred to as "memory" have higher speed(s) and lower latencies than the component(s) referred to as "disks." Thus, e.g., the disks 206 may be solid-state devices (SSDs) with no moving parts, and the memory 204 may be RAM or the like. In some cases, the component(s) may be referred to as classes of storage, with a first class of storage mechanisms having higher speed(s) and lower latencies than the second class of storage mechanisms.

For example, during normal operation, when the device 200 is connected to at least one external CD logging mechanism 116 (e.g., to at least one CD logging mechanism 116 in the or logging network 118), the log message handler 202 sends log data from the various services to the connected external location(s). It may sometimes be necessary to buffer certain log data, even when external connections exist, in which case some log data may be stored in a portion of memory 204 (e.g., in a pre-allocated memory portion 208).

However, when the device 200 loses its external connections (for logging purposes), or when all external connections degrade, then the necessity for storing log data on the device may increase.

Log data may be categorized or prioritized based on its importance (e.g., importance to the CDN operator). For example, log data about the current state of the device, while useful for a time, may be discarded if space is needed. On the other hand log data to be used for billing or accounting purposes (e.g., log data about content delivered by the device on behalf of a CDN subscriber) may need to be retained.

When a device loses external connection (for the purposes of sending logging data), or when all external connections degrade to the point where all log data cannot be sent off the device at a sufficient rate, then the priority or category of various log data items may be used to determine what log data to keep and where to keep it. In the case of a degraded connection, higher priority logging data should be transmitted first.

Figure 2:
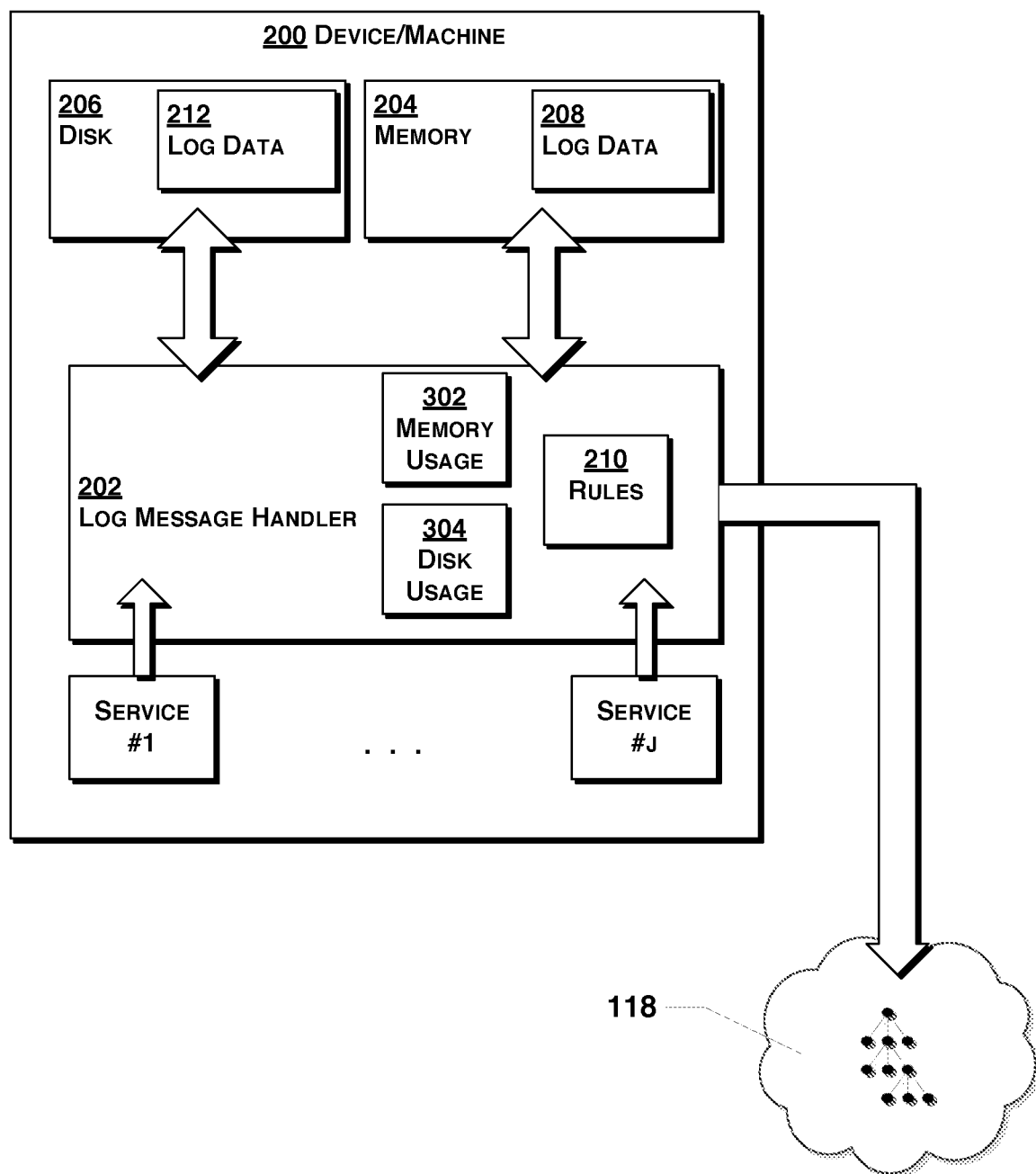

With reference to FIGS. 2 and 3A, log retention rules 210 may be maintained on the device 200 for use by the log message handler 202 to determine how to handle log messages when external logging connections are lost or degraded. As shown in the exemplary data structure in FIG. 3A, log retention rules 210 may include a log data type (e.g., billing log data, connection log data, performance log data, ... Tk), a corresponding priority for each log data type (e.g., I, II, or III), a percentage of reserved memory storage (e.g., 50%, 25%, 10% ... Pk %), and a percentage of reserved disk storage (e.g., 90%, 8%, 1% . . . .). Note that in this example, priority I is higher than priority II which is higher than priority III.

Recall that, if needed, some log data may be stored in a portion of memory 204 (e.g., in a pre-allocated memory portion 208). The percentage of reserved memory storage in the log retention rules 210 corresponds to a percentage of that pre-allocated memory portion 208. The pre-allocated memory portion 208 is preferably a small percentage of memory 204 (e.g., 2%-10%, although higher and lower percentages are contemplated). Thus, e.g., if the pre-allocated memory portion 208 is 6% of memory 204, then using the example data in FIG. 3A, 50% of that portion (i.e., 3% of memory 204) is reserved for billing log data. In general, Pk % of the pre-allocated memory portion 208 is reserved for log data of type Tk.

In a similar manner, a portion 212 of disk storage 206 may be pre-allocated for log data to be stored on disk. The percentage of reserved disk space in the log retention rules 210 corresponds to a percentage of the pre-allocated portion 212 of disk storage 206. As shown in the example in FIG. 3A, the allocation percentages for the log data portion 212 on the disk storage 206 may differ from the allocations in the pre-allocated memory portion 208. For example, in some embodiments, high priority data (e.g., with Priority I) may get 90% or even 100% of log data portion 212, with lower priority data (e.g., Priority II or III) getting 8% or even as low as zero percent allocated.

The reserved disk and memory storage percentages for each type may have any value, although all reserved storage percentages for memory (and likewise for disk) should not exceed 100 percent. High priority data may also be small in comparison with lower priority data, and so it should be appreciated that the exemplary percentages in FIG. 3A are not intended to reflect the limit that data of each priority may consume at any given point in time. For instance, priority I data being granted 90% of disk means that such priority data may grow to consume such 90%. However, if at some point in time high priority data are only consuming a portion of their allocation, say, e.g., 10% of the total, then lower priority may consume the remaining portion (80% in this example). If high priority data needs to store additional data to disk, and the entire allocation has been consumed, then some lower priority data will be ejected to make room for higher priority data. In this way, short outages communicating to logging mechanism 116 may be absorbed without loss of data. Longer outages may result in lower priority data being lost before any high priority data is discarded.

The various log data types (billing, connection, performance, etc.) are given only by way of example, and those of ordinary skill in the art will appreciate and understand, upon reading this description, that there may be different and/or other log data types. Similarly, only three priorities (I, II, and III) are shown, although there may be more or fewer priorities.

Figure 4A:
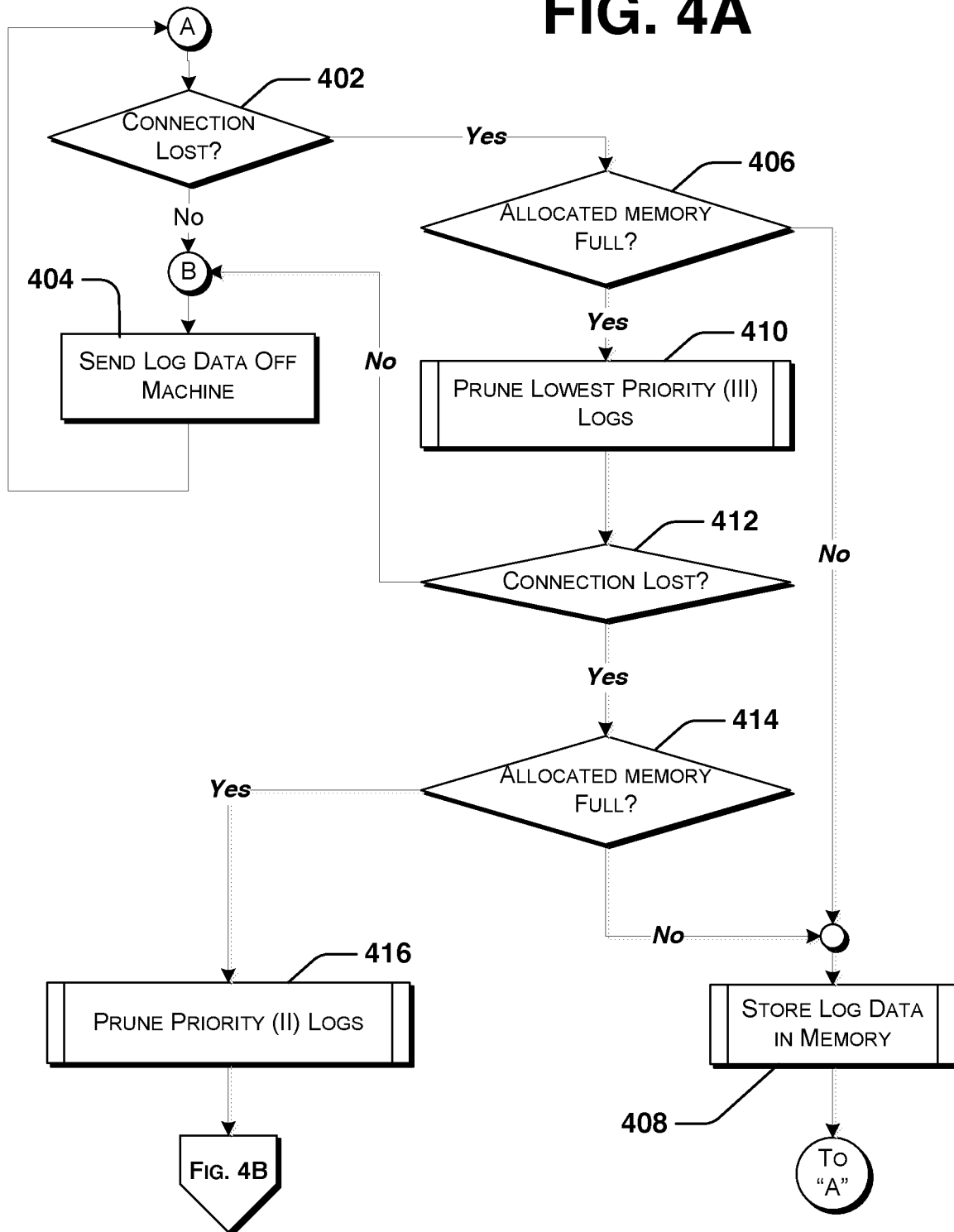
FIGS. 4A-4B show a flowchart depicting aspects of exemplary embodiments hereof.
Figure 4B:
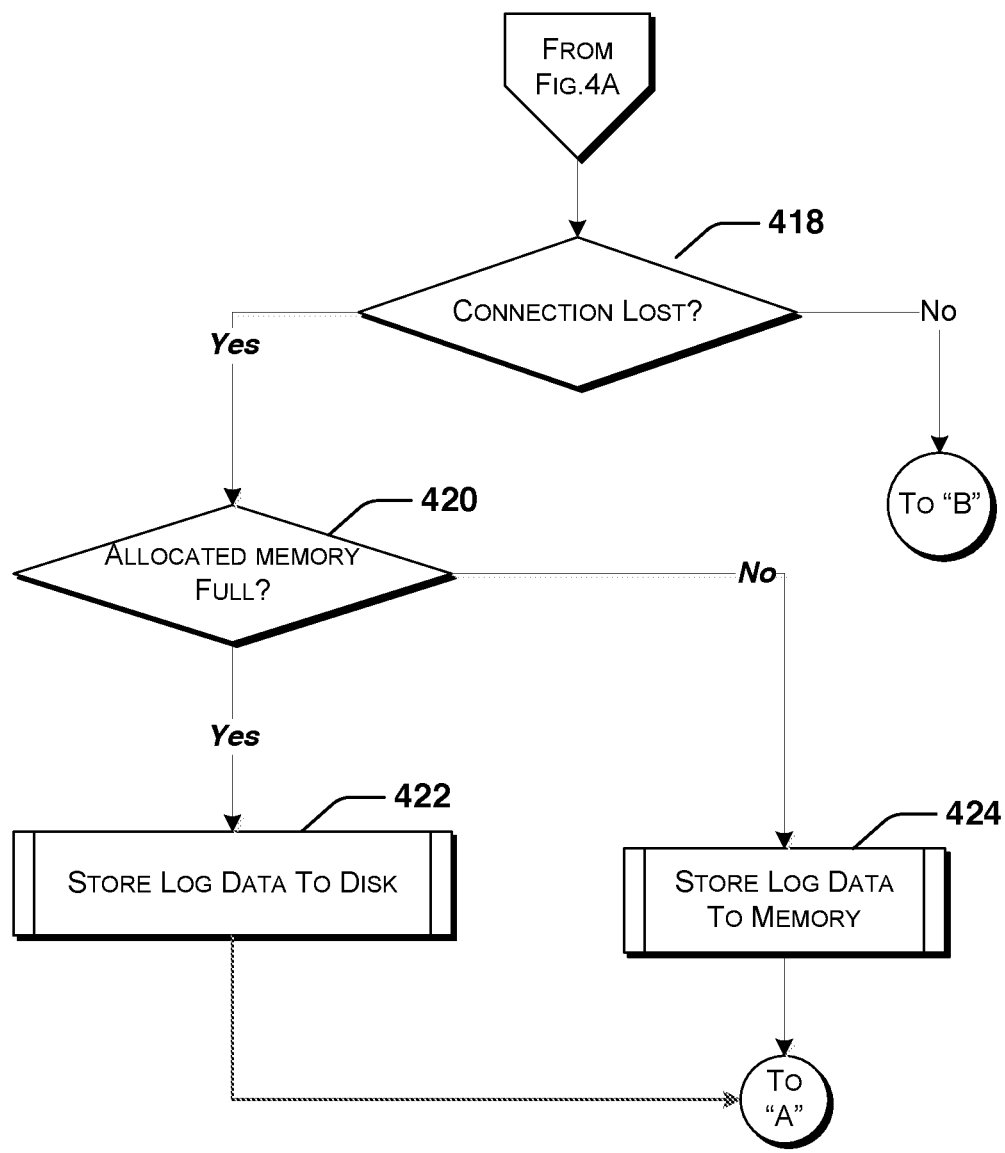

Exemplary operation of the log message handler 202 is described here with reference to the flowcharts in FIGS. 4A-4B. The example assumes only three priorities (I, II, and III). As noted above, those of ordinary skill in the art will appreciate and understand, upon reading this description, that a similar flow may be used for greater or fewer priority levels.

The log message handler 202 preferably tracks the space allocated and used, per priority, and for each type of storage. For example, as shown in FIGS. 3B-3C, an exemplary log message handler 202 may use and maintain local records (e.g., tables 302, 304) to reflect the amount of free space available (in the pre-allocated memory or disk).

As noted, the log message handler 202 repeatedly consumes log data from the various services on the device 200 and sends the log data (possibly modified or compressed) off the device 200, buffering the log data locally (on the device) if needed. With reference to the flowchart in FIG. 4A, the log message handler 202 checks (at 402) if its external connection(s) is (are) lost. A connection may considered to be lost if it is completely lost (disconnected) or sufficiently degraded to prevent reliable transmission of data. In some cases, a connection may be considered lost if it is degraded such that the throughput rate on it is not sufficient to match the log data generation rate. If the connection is not determined to be lost (at 402), then the log message handler 202 sends log data off the machine (at 404). On the other hand, if it is determined (at 402) that the connection is lost, then the log message handler 202 will try to store log data on the device 200, in accordance with the log retention rules 210. Recall that it is preferable to use faster storage (e.g., memory storage) instead of or before slower storage (e.g., disk storage).

Accordingly, if it is determined (at 402) that the connection is lost, the log message handler 202 checks if the allocated memory (pre-allocated memory portion 208) for this log data (based on type and/or priority) is full (at 406). Recall (from FIG. 3A and related description), that the rules 210 allot a percentage of pre-allocated memory to each type of log data. For example, as shown in FIG. 3A, "connection" log data have priority II and are allotted 25% of the reserved memory and 8% of the reserved disk (i.e., 25% of pre-allocated memory portion 208, and 8% of pre-allocated disk portion 212), whereas "performance" log data have priority III and are allotted 10% of the reserved memory and 1% of the reserved disk space, (i.e., 10% of pre-allocated memory portion 208, and 1% of pre-allocated disk portion 212).

If the allocated memory for certain log data is not full (based on the type and/or priority of the log data), then those certain log data are stored in the pre-allocated memory portion 208 of memory 204 (at 408), and processing continues (at "A" in FIG. 4A, to determine if the external connections are lost (at 402)). Since the pre-allocated memory portion 208 is essentially sub-allocated (to different log data based on priority and/or other criteria, e.g., as reflected in the rules 210), the log message handler 202 tracks the amount of pre-allocated memory portion 208 used for each type/priority (e.g., in a table 302 as shown in FIG. 3B). When the allotment of pre-allocated memory portion 208 for a particular priority (or other criteria) is full, the pre-allocated memory portion 208 is considered to be full for that priority (or other criteria) of log message.

The example data structure (table) shown in FIG. 3B represents a snapshot of the data at a particular time and is provided merely as an example. Note that the values under the "Amount Reserved" column correspond to the percentages of reserved memory in the rules 210. The amount used corresponds to an exemplary snapshot of the data. In the example data, 50% of the pre-allocated memory portion 208 is allotted to priority I data, of which 80% has been used; 25% of the pre-allocated memory portion 208 is allotted to priority II data, of which 7% has been used; and 10% of the pre-allocated memory portion 208 is allotted to priority III data, of which 11% has been used.

On the other hand, if it is determined (at 406) that the allocated memory portion 208 is full (for particular log data), then the log message handler 202 starts to prune log data. First (at 410), the log message handler 202 prunes the lowest priority log data (i.e., in this example, priority III log data). As used herein, the term "prune" (or "prunes") with respect to log data refers to reducing the amount or size of the log data. Pruning may include, without limitation, deleting, compressing, and/or moving data (e.g., writing data to disk). In preferred embodiments hereof, the pruning of log data comprises primarily deleting log data. In some cases, the log message handler 202 may determine and declare that memory is full for the current priority of log data and have a new record written to disk.

After the log message handler 202 has pruned the lowest priority log data (at 410), it again checks (at 412) whether the external connection to the logging network is (still) lost. If the connection is not (i.e., no longer) lost, then processing continues (at "B", 404), sending log data off the machine. On the other hand, if it is determined (at 412) that the connection is (still) lost, then the log message handler 202 again checks (at 414) if the pre-allocated memory 208 for this log data is full. If the pre-allocated memory portion 208 for this data is not full, log data are stored in the pre-allocated memory portion 208 (at 408), and processing continues (at "A" in FIG. 4A, to determine if the external connections are lost (at 402)). On the other hand, if it is determined (at 414) that the allocated memory portion 208 for this data is full, then (at 416) the log message handler 202 prunes the next priority level log data (in this example, priority II log data).

After pruning the next priority level of log data (at 416), the log message handler 202 again checks (at 418) if the external connections are lost. If the connections are not still lost, the processing continues (at "B", 404), sending log data off the machine. On the other hand, if the external connections are still determined (at 418) to be lost, then, if the allocated memory is full (as determined at 420), log data are stored (at 422) to disk (to pre-allocated disk portion 212), and then processing continues (at "A", 402 in FIG. 4A).

As with the memory allocation, since the pre-allocated disk portion 212 is essentially sub-allocated (to different log data based on priority and/or other criteria, e.g., as reflected in the rules 210), the log message handler 202 tracks the amount of pre-allocated disk portion 212 used for each type/priority (e.g., in a table 304 as shown in FIG. 3C). When the allotment of pre-allocated disk portion 212 for a particular priority (or other criteria) is full, the pre-allocated disk portion 212 is considered to be full for that priority (or other criteria) of log message.

The example data structure (table) shown in FIG. 3C represents a snapshot of the data at a particular time and is provided merely as an example. Note that the values under the "Amount Reserved" column correspond to the percentages of reserved disk in the rules 210. The amount used corresponds to an exemplary snapshot of the data. In the example data, 90% of the pre-allocated portion 212 is allotted to priority I data, of which 5% has been used; 8% of the pre-allocated portion 212 is allotted to priority II data, of which 90% has been used; and 1% of the pre-allocated portion 212 is allotted to priority III data, of which 75% has been used.

On the other hand, if the pre-allocated memory is not full (as determined at 420), then log data are stored in the pre-allocated memory portion 208 (at 424), and processing continues (at "A" in FIG. 4A, to determine if the external connections are lost (at 402)).

When log data are pruned (from memory or disk), the log message handler 202 updates its local records (e.g., tables 302, 304) to reflect the amount of free space available (in the pre-allocated memory or disk).

In some embodiments, the rules (e.g., in the rules table) may also indicate what to do on recovery, for example, whether it is important to send data in time order (i.e., drain the stored backlog before any new records) or if new records should be sent as soon as the connection is re-established (to prevent additional entries being added to the stored data) and/or the stored data drained interspersed with the new records. In preferred embodiments, delivery of data after the connection is reestablished should be done in priority order (among other reasons, in case the connection is lost again).

As should be appreciated, this process on the log message handler 202 repeats during operation of the device, storing data to disk when the pre-allocated memory portion is full (or not available). In general, the process in the log message handler 202 favors faster memory to slower storage mechanisms, and so stores log data to the faster memory before resorting to storage in lower memory. In addition, the process favors higher priority log data, and so preferably prunes lower priority log data before storing it to disk.

In some cases, if the log message handler 202 has filled up the memory and disk storage allocations (208, 212), the log message handler 202 may advise the CDN system (e.g., the rendezvous system 112) to stop or slow sending client requests to the device until such time as it catches up with its log data.

The logging mechanisms 116 that form the logging network 118 are, themselves, CD components or services. As such, they too produce log event data that will be sent to (and processed by) other logging mechanisms in the logging network.

COMPUTING

The services, mechanisms, operations and acts shown and described above are implemented, at least in part, by software running on one or more computers of a CDN.

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

Figure 5:
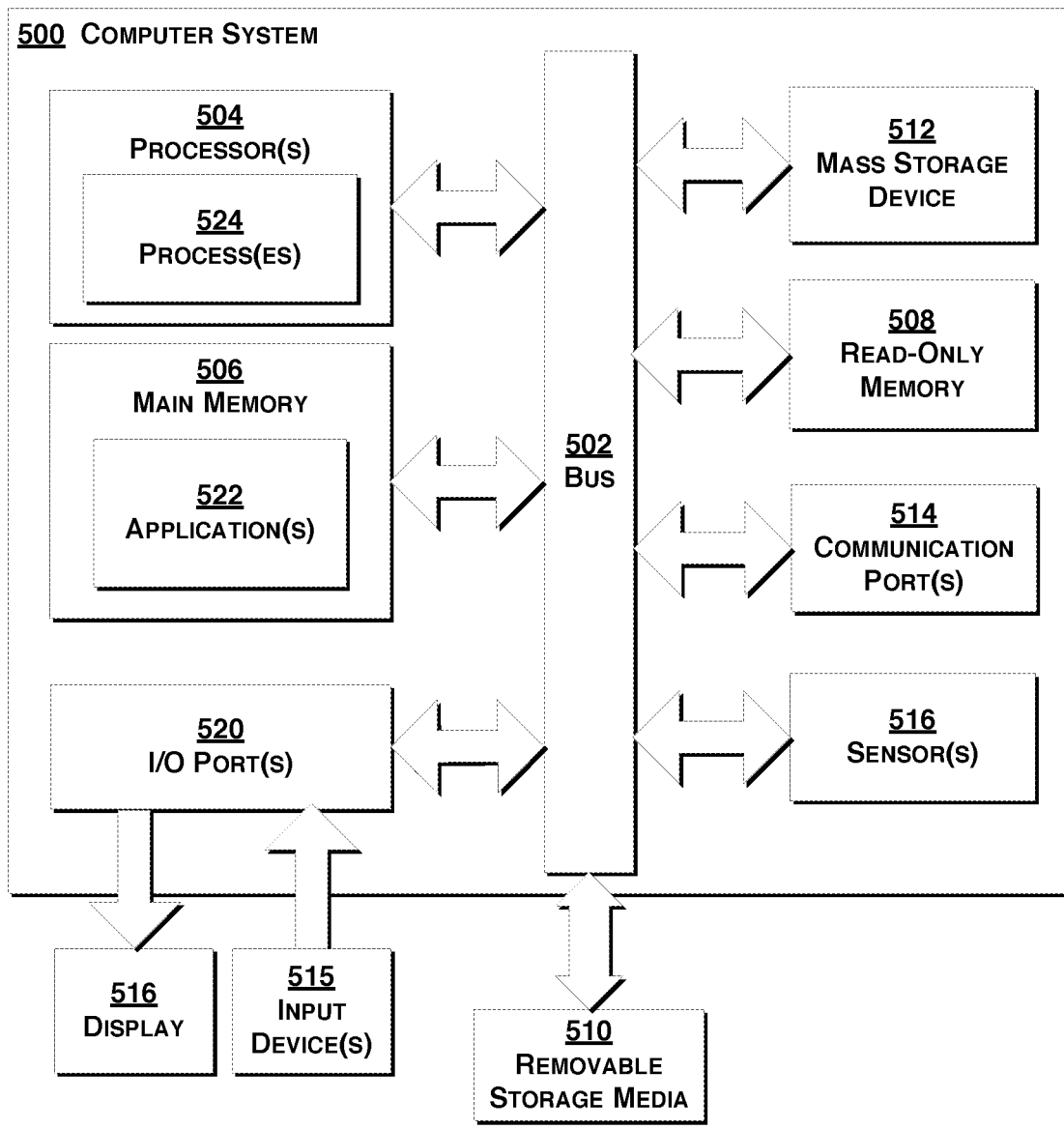
FIG. 5 depicts aspects of computing according to exemplary embodiments hereof.

FIG. 5 is a schematic diagram of a computer system 500 upon which embodiments of the present disclosure may be implemented and carried out.

According to the present example, the computer system 500 may include a bus 502 (i.e., interconnect), one or more processors 504, a main memory 506, read-only memory 508, removable storage media 510, mass storage 512, and one or more communications ports 514. As should be appreciated, components such as removable storage media are optional and are not necessary in all systems. Communication port 514 may be connected to one or more networks by way of which the computer system 500 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 504 can be any known processor, such as, but not limited to, an Intel® Itanium® or Itanium 2® processor(s), AMD® Opteron® or Athlon MP® processor(s), or Motorola® lines of processors, and the like. Communications port(s) 514 can be any of an RS-232 port for use with a modem based dial-up connection, a Ethernet port, a Gigabit port using copper or fiber, or a USB port, and the like. Communications port(s) 514 may be chosen depending on a network such as a Local Area Network (LAN), a Wide Area Network (WAN), a CDN, or any network to which the computer system 500 connects. The computer system 500 may be in communication with peripheral devices (e.g., display screen 516, input device(s) 518) via Input/Output (I/O) port 520.

Main memory 506 can be Random Access Memory (RAM), or any other dynamic storage device(s) commonly known in the art. Read-only memory 508 can be any static storage device(s) such as Programmable Read-Only Memory (PROM) chips for storing static information such as instructions for processor 504. Mass storage 512 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 502 communicatively couples processor(s) 504 with the other memory, storage, and communications blocks. Bus 502 can be a PCI/PCI-X, SCSI, a Universal Serial Bus (USB) based system bus (or other) depending on the storage devices used, and the like. Removable storage media 510 can be any kind of external hard-drives, floppy drives, IOMEGA® Zip Drives, Compact Disc—Read Only Memory (CD-ROM), Compact Disc—Re-Writable (CD-RW), Digital Versatile Disk—Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMS, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 506 is encoded with application(s) 522 that supports the functionality discussed herein (the application 522 may be an application that provides some or all of the functionality of the CD services described herein, including the client application). Application(s) 522 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 504 accesses main memory 506 via the use of bus 502 in order to launch, run, execute, interpret or otherwise perform the logic instructions of the application(s) 522. Execution of application(s) 522 produces processing functionality of the service related to the application(s). In other words, the process(es) 524 represent one or more portions of the application(s) 522 performing within or upon the processor(s) 504 in the computer system 500.

It should be noted that, in addition to the process(es) 524 that carries (carry) out operations as discussed herein, other embodiments herein include the application 522 itself (i.e., the un-executed or non-performing logic instructions and/or data). The application 522 may be stored on a computer readable medium (e.g., a repository) such as a disk or in an optical medium. According to other embodiments, the application 522 can also be stored in a memory type system such as in firmware, read only memory (ROM), or, as in this example, as executable code within the main memory 506 (e.g., within Random Access Memory or RAM). For example, application 522 may also be stored in removable storage media 510, read-only memory 508 and/or mass storage device 512.

Those skilled in the art will understand that the computer system 500 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

CONCLUSION

As used herein, including in the claims, the phrase "at least some" means "one or more," and includes the case of only one. Thus, e.g., the phrase "at least some services" means "one or more services", and includes the case of one service.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner. A list may include duplicate items. For example, as used herein, the phrase "a list of CDN services" may include one or more CDN services.

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram, the activities associated with those boxes may be performed in any order, including fully or partially in parallel.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

While various embodiments have been described herein, other manners are contemplated.

As used in this description, the term "portion" means some or all. So, for example, "A portion of X" may include some of "X" or all of "X". In the context of a conversation, the term "portion" means some or all of the conversation.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

Use of exemplary language, such as "for instance", "such as", "for example" ("e.g.,") and the like, is merely intended to better illustrate the invention and does not indicate a limitation on the scope of the invention unless specifically so claimed.

No ordering is implied by any of the labeled boxes in any of the flow diagrams unless specifically shown and stated. When disconnected boxes are shown in a diagram, the activities associated with those boxes may be performed in any order, including fully or partially in parallel.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

I claim:

1. A computer-implemented method operable on a device, said device comprising hardware including storage, the method comprising:
   obtaining, from at least one component or service on said device, log event data items, each item of log event data being produced by a corresponding at least one component or service on said device, each log event data item having a corresponding priority of at least two priorities;
   determining that a connection to at least one external location is lost; and
   selectively storing at least some of said log event data items in said storage, wherein said storing is based on priority of said log event data items.

2. The method of claim 1, wherein said storing is based on priority-based rules.

3. The method of claim 2, wherein said priority-based rules comprise priority-based allotments of a first class of said storage.

4. The method of claim 3, wherein said priority-based rules comprise priority-based allotments of a second class of said storage.

5. The method of claim 1, further comprising:
   determining that said connection to said at least one external location is not still lost; and sending at least some stored log event data items to said at least one external location.

6. The method of claim 1 wherein a first class of said storage comprises memory storage.

7. The method of claim 6, wherein a second class of said storage comprises disk storage.

8. The method of claim 1, wherein said connection is considered to be lost in if: the connection is (i) disconnected, or (ii) sufficiently degraded to prevent reliable transmission of data, or (iii) degraded such that a throughput rate on the connection is not sufficient to match the log data generation rate.

9. The method of claim 1, further comprising:
pruning at least some log event data stored in said storage.

10. The method of claim 1, wherein said storing uses storage of a first class of said storage before using storage of a second class of said storage.

11. The method of claim 2, wherein said priority-based rules allocate a non-zero amount of storage of a first class of said storage for at least one of said priorities.

12. The method of claim 11, wherein said priority-based rules allocate a non-zero amount of storage of a second class of said storage for at least one of said priorities.

13. The method of claim 11, wherein said device tracks usage of storage of said first class of storage for at least one of said priorities.

14. The method of claim 12, wherein said device tracks usage of storage of said second class of storage for at least one of said priorities.

15. An article of manufacture comprising a nontransitory computer-readable medium having program instructions stored thereon, the program instructions, operable on a device, said device comprising hardware including storage, wherein said instructions, when executed by a processor in said device, cause said processor to:
obtain, from at least one component or service on said device, log event data items, each item of log event data being produced by a corresponding at least is one component or service on said device, each log event data item having a corresponding priority of at least two priorities;
determine that a connection to at least one external location is lost; and
selectively store at least some of said log event data items in said storage, wherein said storing is based on priority of said log event data items.

16. The article of manufacture of claim 15, wherein said storing is based on priority-based rules.

17. The article of manufacture of claim 16, wherein said priority-based rules comprise priority-based allotments of a first class of said storage.

18. The article of manufacture of claim 17, wherein said priority-based rules comprise priority-based allotments of a second class of said storage.

19. The article of manufacture of claim 15, wherein said instructions, when executed by a processor in said CDN, further cause said processor to:
determine that said connection to said at least one external location is not still lost; and
send at least some stored log event data items to said at least one external location.

20. The article of manufacture of claim 15, wherein a first class of said storage comprises memory storage.

21. The article of manufacture of claim 20, wherein a second class of is said storage comprises disk storage.

22. The article of manufacture of claim 15, wherein said connection is considered to be lost if: the connection is (i) disconnected, or (ii) sufficiently degraded to prevent reliable transmission of data, or (iii) degraded such that a throughput rate on the connection is not sufficient to match the log data generation rate.

23. The article of manufacture of claim 15, said instructions, when executed by a processor in said CDN, further cause said processor to:
prune at least some log event data stored in said storage.

24. The article of manufacture of claim 15, wherein said storing uses storage of a first class of said storage before using storage of a second class of said storage.

25. The article of manufacture of claim 15, wherein said priority-based rules allocate a non-zero amount of storage of a first class of said storage for at least one of said priorities.

26. The article of manufacture of claim 25, wherein said priority-based rules allocate a non-zero amount of storage of a second class of said storage for at least one of said priorities.

27. The article of manufacture of claim 25, wherein said device tracks usage of storage of said first class of storage for at least one of said priorities.

28. The article of manufacture of claim 26, wherein said device tracks usage of storage of said second class of storage for at least one of said priorities.

* * * * *